(12) United States Patent
César Proença Ribeiro et al.

(10) Patent No.: US 12,151,190 B2
(45) Date of Patent: Nov. 26, 2024

(54) FILTER ELEMENT WITH AN ANNULAR SEAL HAVING A POSITIONING AND SEALING SECTION WITH CONCENTRIC ANNULAR SEAL RINGS FORMING A SEALING GROOVE

(71) Applicant: MANN+HUMMEL GmbH, Ludwigsburg (DE)

(72) Inventors: Bruno César Proença Ribeiro, São Paulo (BR); Fabio Faria de Souza, São Paulo (BR); Francisco José da Silva Henriques, São Paulo (BR)

(73) Assignee: MANN+HUMMEL GmbH, Ludwigsburg (DE)

( * ) Notice: Subject to any disclaimer, the term of this patent is extended or adjusted under 35 U.S.C. 154(b) by 389 days.

(21) Appl. No.: 17/679,299

(22) Filed: Feb. 24, 2022

(65) Prior Publication Data
US 2023/0264129 A1 Aug. 24, 2023

(51) Int. Cl.
*B01D 46/24* (2006.01)
*B01D 35/147* (2006.01)
*B01D 35/16* (2006.01)
*B01D 46/00* (2022.01)

(52) U.S. Cl.
CPC ........ *B01D 46/2411* (2013.01); *B01D 35/147* (2013.01); *B01D 35/16* (2013.01); *B01D 46/0005* (2013.01); *B01D 2201/0415* (2013.01); *B01D 2201/305* (2013.01); *B01D 2201/34* (2013.01); *B01D 2265/06* (2013.01); *B01D 2271/02* (2013.01); *B01D 2271/022* (2013.01); *B01D 2271/027* (2013.01); *B01D 2275/203* (2013.01)

(58) Field of Classification Search
None
See application file for complete search history.

(56) References Cited

U.S. PATENT DOCUMENTS

| | | | |
|---|---|---|---|
| 5,487,767 | A | 1/1996 | Brown |
| 6,706,087 | B1 | 3/2004 | Gebler et al. |
| 8,292,984 | B2 | 10/2012 | Baseotto et al. |
| 8,864,866 | B2 | 10/2014 | Osendorf et al. |
| 9,221,004 | B2 | 12/2015 | Iddings et al. |
| 9,238,189 | B2 | 1/2016 | Baseotto et al. |
| 9,358,489 | B2 | 6/2016 | Kaufmann et al. |
| 10,029,198 | B2 | 7/2018 | Adamek et al. |
| 10,518,204 | B2 | 12/2019 | Adamek et al. |
| 10,625,191 | B2 | 4/2020 | Campbell et al. |
| 2009/0049814 | A1 | 2/2009 | Baseotto et al. |
| 2010/0064646 | A1 | 3/2010 | Smith et al. |

(Continued)

Primary Examiner — Jason M Greene

(57) ABSTRACT

A filter element for exchangeable installation into a filter housing has an annular filter medium with an annular seal secured directly or indirectly onto the first axial end. The annular seal having a positioning and sealing section and concentric annular sealing rings between which a sealing groove is formed. A radially outer side of the radially outer annular ring having a key locking system formed by a plurality of circumferentially spaced apart radial projections, spaced apart by radial indentations, adapted to positively engage cooperative configured geometries or key locking features of a filter housing when in an installed state, thereby locking a rotational orientation and position of the filter element.

18 Claims, 4 Drawing Sheets

(56) References Cited

U.S. PATENT DOCUMENTS

| | | | |
|---|---|---|---|
| 2010/0263339 A1* | 10/2010 | Steins | B01D 46/2414 |
| | | | 55/498 |
| 2013/0263744 A1* | 10/2013 | Osendorf | B01D 46/0005 |
| | | | 55/497 |
| 2014/0096495 A1 | 4/2014 | Iddings et al. | |
| 2014/0144111 A1 | 5/2014 | Campbell et al. | |
| 2016/0375391 A1 | 12/2016 | Adamek et al. | |
| 2018/0361292 A1 | 12/2018 | Adamek et al. | |
| 2019/0070545 A1* | 3/2019 | Donauer | B01D 46/0005 |
| 2019/0076772 A1 | 3/2019 | Baseotto et al. | |
| 2020/0246739 A1 | 8/2020 | Adamek et al. | |

\* cited by examiner

FILTER ELEMENT WITH AN ANNULAR SEAL HAVING A POSITIONING AND SEALING SECTION WITH CONCENTRIC ANNULAR SEAL RINGS FORMING A SEALING GROOVE

TECHNICAL FIELD

The present invention relates to a filter element and a filter system comprising such a filter element.

BACKGROUND OF THE INVENTION

A filter system, for example an air filter system, comprises a filter housing and a filter element removably received in the filter housing. Such a filter element may include a pleated filter medium placed between and fixedly connected to two end discs. At least one of the end discs may comprise a sealing element, by means of which the filter element is sealable with respect to the filter housing. Furthermore, this end disc can also have a contour in which a corresponding mating contour of the filter housing can engage in a form-fitting manner. This ensures that only filter elements suitable for the filter system can be installed in the filter housing. This means that filter elements without such a matching contour cannot be installed in the filter housing.

WO 2012/172019 A1 shows an air filter system comprising a housing with a housing top and an air filter element for filtering air. The housing comprises a clean air connection piece for discharging clean air from the housing and a seal receptacle for positive connection to a cylindrical seal of the air filter element and for holding the air filter element, the seal receptacle having a cylindrical sealing surface extending from the housing upper part into the interior of the housing, which encloses the clean-air connection piece and against which the seal of the air filter element can be placed radially, there being arranged on the sealing surface an annular projection which projects radially beyond the sealing surface and around which the seal of the air filter element can engage in a form-fitting manner.

SUMMARY

In view of this background, the present inventive disclosure is directed to an improved filter element.

Accordingly, a filter element for a filter system is disclosed. The filter element comprises an annular filter medium, a first end disc having an annular seal connected to the filter medium and a second end disc connected to the filter medium, the filter medium being arranged between the first end disc and the second end disc, the first end disc comprising a positioning and sealing section form as an annular seal facing away from the filter medium, the positioning and sealing section comprising positioning recesses or radial indentations on the radial outside which are adapted to positively engage cooperative configured geometries or key locking features of a filter housing of the filter system into the positioning indentations or recesses, in order to position the filter element circumferentially with respect to the filter housing, the positioning and sealing section comprising, on the inside, an interface which is designed to seal the filter element radially with respect to the filter housing and to position it axially with respect to the filter housing, and the interface extending further into the positioning and sealing section than the positioning recesses, as viewed along a longitudinal direction of the filter element which is oriented from the first end disc in the direction of the second end disc.

By the interface extending further into the positioning and sealing section than the positioning recesses, it can be achieved that an interface of the filter housing extending beyond the interference geometries in the longitudinal direction can be guided at the interface of the filter element. As a result, the filter element is guided on the filter housing when the filter element is rotated with respect to the filter housing to position the filter element with respect to the filter housing.

The filter medium is preferably pleated. In particular, the filter medium forms a circumferentially closed bellows. The end discs are preferably made of a plastic material. For example, the end discs may be PU or polyurethane foamed and/or molded onto the filter medium at the end face, or may be another elastomeric material suitable for forming a structurally robust and elastomeric seal, as well as structurally resilient to provide for the disclosed kep lock align features of the invention. Preferably, both the first end disc and the second end disc are firmly connected to the filter medium. The filter element is preferably rotationally symmetrical about a central axis or axis of symmetry. The end discs are preferably constructed in particular rotationally symmetrically with respect to this axis of symmetry, or center axis. However, the filter element can also have an oval geometry in cross-section. In this case, the filter element is not rotationally symmetrical about the axis of symmetry.

The positioning and sealing section can alternatively also be provided on the second end disc. The positioning and sealing section is formed in one piece, in particular in one piece of material, with the first end disc. "One piece" or "one-piece" means in the present case that the first end disc and the positioning and sealing section form a common component and are not composed of different components, but are instead formed together at the same time as one unitary component. "One-piece material" means in the present case that the first end disc and the positioning and sealing section are made of the same material throughout.

The positioning and sealing section extends or projects out of an end face of the first end disc facing away from the filter medium. The positioning and sealing section is rotationally symmetrical to the axis of symmetry and runs completely around it. The positioning and sealing section is thus preferably annular. The number of positioning recesses is arbitrary. The fact that the positioning recesses are arranged "on the outside" of the positioning and sealing section means that the positioning recesses point away from the axis of symmetry.

A form-fit connection is created by the interlocking or rear engagement of two connection partners, in this case the interference geometries of the filter housing and the positioning recesses or indentations of the filter element. In an assembled state of the filter element, the interfering geometries engage positively in the positioning recesses so that the filter element cannot be rotated relative to the filter housing. As long as the interfering geometries do not yet engage in the positioning recesses, it is possible to rotate the filter element relative to the filter housing. The filter element can be rotated relative to the housing until the positioning recesses are aligned with the corresponding interfering geometries, so that the interfering geometries engage in the positioning recesses.

As soon as the interference geometries engage in the positioning recesses, the filter element can be inserted into the filter housing in an insertion direction that is preferably oriented opposite to the longitudinal direction of the filter element. This seals the interface of the filter element with respect to the filter housing. The filter housing preferably has an interface corresponding to the interface of the annular seal of the filter element. The fact that the positioning recesses are suitable for positioning the filter element "circumferentially" relative to the filter housing means that when the interference geometries engage in the positioning recesses, twisting of the filter element relative to the filter housing is no longer possible.

In embodiments, the first end disc is open and the second end disc is closed. Conversely, the first end disc may also be closed and the second end disc may be open. Furthermore, both end discs may also be open. "Open" means in the present case that the respective end disc has an aperture, in particular an outflow opening, through which a fluid can flow out of an interior of the filter element. The aperture is preferably rotationally symmetrical to the axis of symmetry.

In embodiments, the positioning recesses are arranged uniformly or non-uniformly distributed around a circumference of the filter element. In particular, the positioning recesses or indentations are arranged uniformly or non-uniformly distributed around the axis of symmetry. "Uniformly" means in the present context that circumferential angles between the individual positioning recesses or distances between the individual positioning recesses are constant or identical. "Non-uniform" means in the present case that circumferential angles between the individual positioning recesses or distances between the individual positioning recesses are different. The number of positioning recesses or indentations is arbitrary. For example, at least three positioning recesses are provided. However, four positioning recesses, five positioning recesses, six positioning recesses or more than six positioning recesses may also be provided, some as shown in the drawings.

That is, the face of the interfering geometries precedes the sealing surface of the filter housing. In other words, when the filter element is installed in the filter housing, it first comes into contact with the end face of the interfering geometries before the interface of the filter element seals against the sealing surface of the filter housing. The filter housing preferably has a lower housing part and an upper housing part that can be separated from one another in order to replace the filter element.

In embodiments, when the filter element is installed in the filter housing, the positioning and sealing section of the filter element first comes into contact with the interference geometries on the end face, it being possible to bring the interference geometries into positive engagement with the positioning recesses by rotating the filter element relative to the filter housing. In other words, the filter element is first inserted into the filter housing or filter housing component in the insertion direction until the positioning and sealing sections rest on the interference geometries. By twisting the filter element relative to the filter housing or component, the positioning recesses can now engage with the interference geometries so that the filter element can be pushed further into the lower part of the housing in order to seal the filter element relative to the filter housing.

In embodiments, a sealing surface of the interface of the filter element does not come into contact with the sealing surface of the filter housing during installation of the filter element into the filter housing until the interference geometries are in positive engagement with the positioning recesses. In other words, as previously mentioned, the filter element can only be pushed further into the filter housing when the interference geometries are aligned with the positioning recesses.

In embodiments, the interference geometries have a greater depth than the sealing surface of the interface when viewed along the longitudinal direction. In particular, the depth is dimensioned as a distance from an end face of the positioning and sealing section to an end face of the first end disc.

In embodiments, the filter housing comprises a sealing rib that engages positively in a sealing groove of the interface of the filter element, wherein the sealing rib is arranged downstream of the sealing surface of the filter housing, as viewed along the longitudinal direction. The sealing rib is annular and runs completely around the axis of symmetry. Because the sealing rib is arranged downstream of the sealing surface of the filter housing, as viewed along the longitudinal direction, the sealing rib only engages in the sealing groove when the sealing surface of the interface of the filter element rests against the sealing surface of the interface of the filter housing and is radially com-pressed relative to the latter.

In embodiments, the filter housing comprises a centering surface, wherein the centering surface is arranged downstream of the sealing rib of the filter housing as viewed along the longitudinal direction. The centering surface is preferably circular-cylindrical in shape and runs completely around the axis of symmetry. The sealing surface of the interface of the filter element is guided on the centering surface as long as the interfering geometries do not yet engage in the positioning recesses of the positioning and sealing section of the filter element, that is, as long as the positioning and sealing section rests on the interfering geometries on the face side and the filter element can be rotated relative to the filter housing.

In embodiments, a circumferential gap is provided between the centering surface of the filter housing and the annular seal interface of the filter element when the filter element is installed in the filter housing. In particular, the gap is an air gap. In the installed state of the filter element, the interference geometries engage positively in the positioning recesses so that the sealing surface of the filter element is radially pressed against the sealing surface of the filter housing.

In embodiments, the perturbation geometries are arranged uniformly or non-uniformly distributed around a circumference of the filter housing. The number of disturbance geometries is arbitrary. For example, three or five such disturbance geometries are provided. "Uniformly" means in the present case that a circumferential angle or distance between the individual disturbance geometries is constant. "Non-uniform" means in the present case that the circumferential angle or distance between the individual disturbance geometries is non-uniform.

In preferred aspects of the invention, the filter element includes an annular filter medium elongated about surrounding a central axis (or axis of symmetry in some cases) of the filter element. The annular seal is secured directly or indirectly onto a first axial end of the filter medium, the annular seal having a central opening which opens into an interior of the annular filter medium. The annular seal having two concentric annular ring projections, also called annular ring portions herein, as they are portions of the annular seal. A radially inner ring and a radially outer ring each projecting outwardly from the first axial end of the filter medium. The two concentric ring projections spaced apart radially so as to form an annular or optionally circular sealing groove therebetween.

In some aspects of the invention, the annular seal having the two concentric annular ring projections is a unitary, one-piece molded component, formed in one piece of molded polyurethane foam or another moldable elastomer material.

In preferred aspects of the invention, a radially outer side of the radially outer annular ring forms a plurality of circumferentially spaced apart radial projections, which project in a radial direction outwardly from a circular or annular main body of the radially outer annular ring. Adjacent ones of the plurality of circumferentially spaced apart radial projections spaced apart by radial indentations which are formed into the radial outer side of the radially outer annular ring portion of the annular seal. The radial indentations formed by gaps or indentations positioned between adjacent ones of the circumferentially spaced apart radial projections.

In preferred aspects of the invention, the annular seal includes an annular base portion which forms an end disc covering the annular end of the annular filter medium. The annular base portion of the annular seal extends radially across and is fixed directly or indirectly onto the first axial end of the filter medium and covering the first axial end of the filter medium. The annular base portion preferably may have a central opening which opens into the interior of the annular filter medium, or the annular base portion may be closed, thereby closing off the interior of the annular filter medium at the first axial end of the annular filter medium.

In a preferred aspect of the invention, the radially inner ring portion of the annular seal is formed on an axially outer face of the annular base portion, surrounding the central opening and projects axially outwardly away from the annular base portion to a first free axial end face of the radially inner ring portion of the annular seal. Similarly, the radially outer annular ring portion of the annular seal, formed on the axially outer face of the annular base portion, projects axially outwardly away from the annular base portion to a second free axial end face of the radially outer annular ring portion. Wherein the first free axial free end face extends axially outward from the annular base portion by a projection distance d2. Wherein the second free axial end face extends axially outward from the radially extending annular base portion by a projection distance d1. Wherein d1>d2, such that the first free axial end face of the radially inner annular ring is recessed axially inwardly from the second free axial end face of the radially outer annular ring. Preferably, the first free axial end face of the radially inner annular ring is recessed axially-inwardly from the second free axial end face of the radially outer annular ring by a distance of about 1 to 5 mm, preferably 3 to 4 mm, to ensure that the plurality of circumferentially spaced apart radial projections of the radially outer ring portion of the annular seal engage against radial alignment fixing key or locking ribs in the filter housing, fixing the rotational position of the filter element in the filter housing, before the radially inner ring portion sealably engages the circular ring projection formed on the interior of the filter housing to seal against flow between the filter housing and the annular seal, ensuring the rotational position is locked before the seal is made in the annular sealing groove between the two concentric annular ring portions of the annular seal.

In some aspects of the invention, the plurality of circumferentially spaced apart radial projections and radial indentations engage into rotational locking filter housing features in the interior of the filter housing, thereby locking the rotational position of the filter element into a fixed position, when in an installed state of the filter element.

In some aspects of the invention, the radial indentations extend axially from the second free axial end face to the annular base portion of the annular seal.

In preferred aspects of the invention, the annular sealing groove is sized an adapted to sealably engage an annular or circular ring projection formed on the interior of the filter housing to radially seal against the radially outer ring and the radially inner ring so as to seal against flow between the filter housing and the annular seal, thereby separating the clean side of the filter element from the raw or dirty side of the filter element.

In some aspects of the invention, the radial indentations have substantially the shape of a cylinder section having an indentation radius R1 relative to the central axis of the filter element.

In preferred aspects of the invention, the plurality of circumferentially spaced apart radial projections have a radially outer face having substantially the shape of a cone section, having a projecting radius R2 relative to the central axis of the filter element. Wherein a radially outer face of the plurality of circumferentially spaced apart radial projections slants radially inwardly relative to the central axis when traversed in an axial direction from the annular base portion of the annular seal to the second free axial end face.

In some aspects of the invention, the annular base portion of the annular seal has an annular lip which projects axially inwardly over a radially outer flow face of the annular filter medium.

In some further aspects of the invention, the annular lip includes a plurality of radial lip indentations circumferentially spaced apart from each other. The radial lip indentations are spaced radially outwardly from the plurality of circumferentially spaced apart radial projections of the radially outer annular ring portion of the annular seal.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
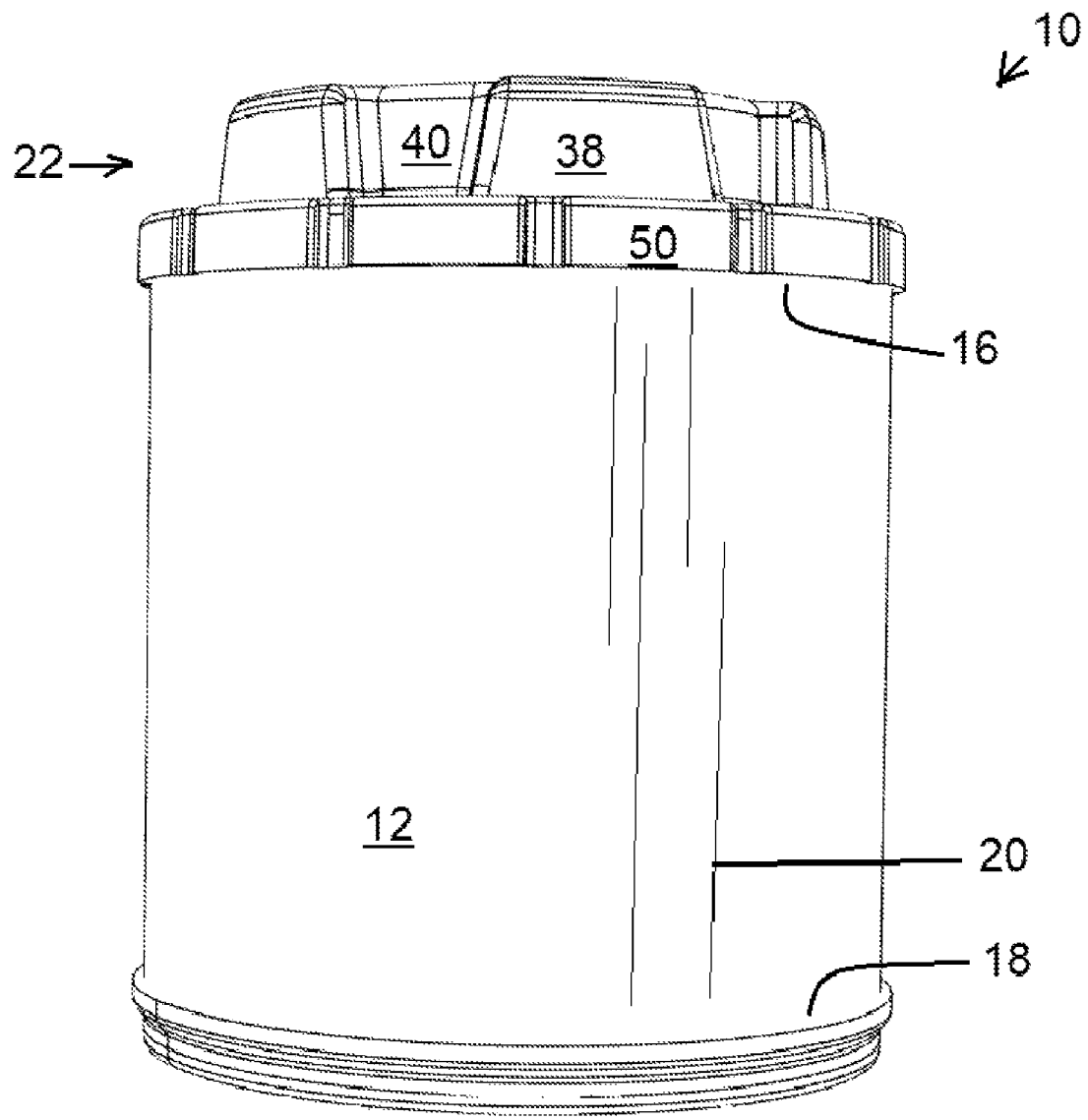
FIG. 1 is a side view of filter element having an end disc provided with the inventive annular seal and positioning device, consistent with the present inventive disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a filter element with an annular seal having a dual annular ring sealing profile and a positioning device having the positioning projects and recesses. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

In FIGS. 1 through 4, a filter element embodiment having an annular seal and positioning device is shown, consistent with the present inventive disclosure. A filter element 10 is depicted configured for exchangeable or replaceable installation into a filter housing. An annular filter medium 12 is arranged in a tubular concentric shape surrounding a central axis 14. Preferably the annular filter medium 12 is zig-zag folded into a plurality of filter medium pleats 20 extending from the first axial end 16 to the second axial end 18. An annular seal 22 secured directly or indirectly onto the first axial end 16 of the filter medium 12 and surrounding a central opening 24 extending through the annular seal 22 and into an interior of the annular filter medium 12. The annular seal has an annular base portion 26 forming an end disc which is radially extending across and fixed onto the first axial end 16 of the filter medium 12 and covering the first axial end 16 of the filter medium 12.

A radially inner ring portion 28 of the annular seal 22 is formed directly on an axially outer face of the annular base portion 26 of the annular seal, surrounding the central opening 24 and projecting axially outwardly away from the annular base portion 26 to a first free axial end face 30 of the radially inner ring portion 28.

Figure 2:
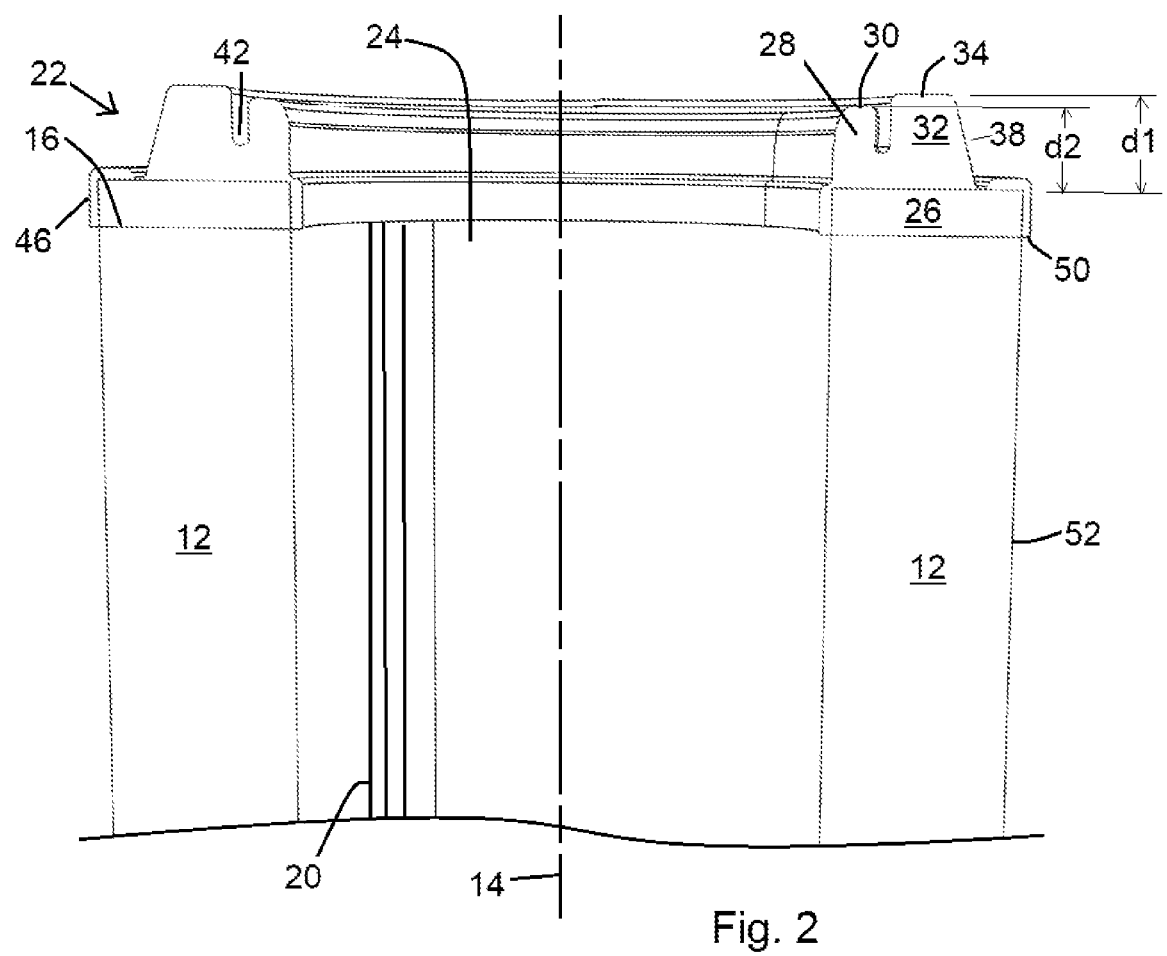
FIG. 2 is a sectional view of a filter element, consistent with the present inventive disclosure, the section taken along a center plane which is lying on the center axis of the filter element and showing key locking, positional alignment and sealing features of the filter element, consistent with the present inventive disclosure.

A radially outer annular ring portion 32 of the annular seal 22 is formed on the axially outer face of the annular base portion 26 and spaced radially outwardly away from radially inner ring portion 28, preferably concentrically arranged and surrounding the central opening 24, as well as projecting axially outwardly away from the annular base portion 26 to a second free axial end face 34 of the radially outer annular ring portion 32. As shown in FIG. 2, preferably the first free axial end face 30 extends axially outward from the annular base portion 26 by a projection distance d2, while the second free axial end face 34 extends axially outward from the radially extending annular base portion 26 by a projection distance d1. Preferably d1>d2, such that the first free axial end face 28 is recessed axially relative to the second free axial end face 34. This provides easier and more reliable alignment and engagement of the filter element onto the positioning ring of the filter housing by ensuring the positioning ring of the housing first contacts the radially outer positioning ring portion 32 of the annular seal 22, providing alignment of the filter element 10, before engaging the radially inner ring portion 28 of the annular seal 22

Figure 3:
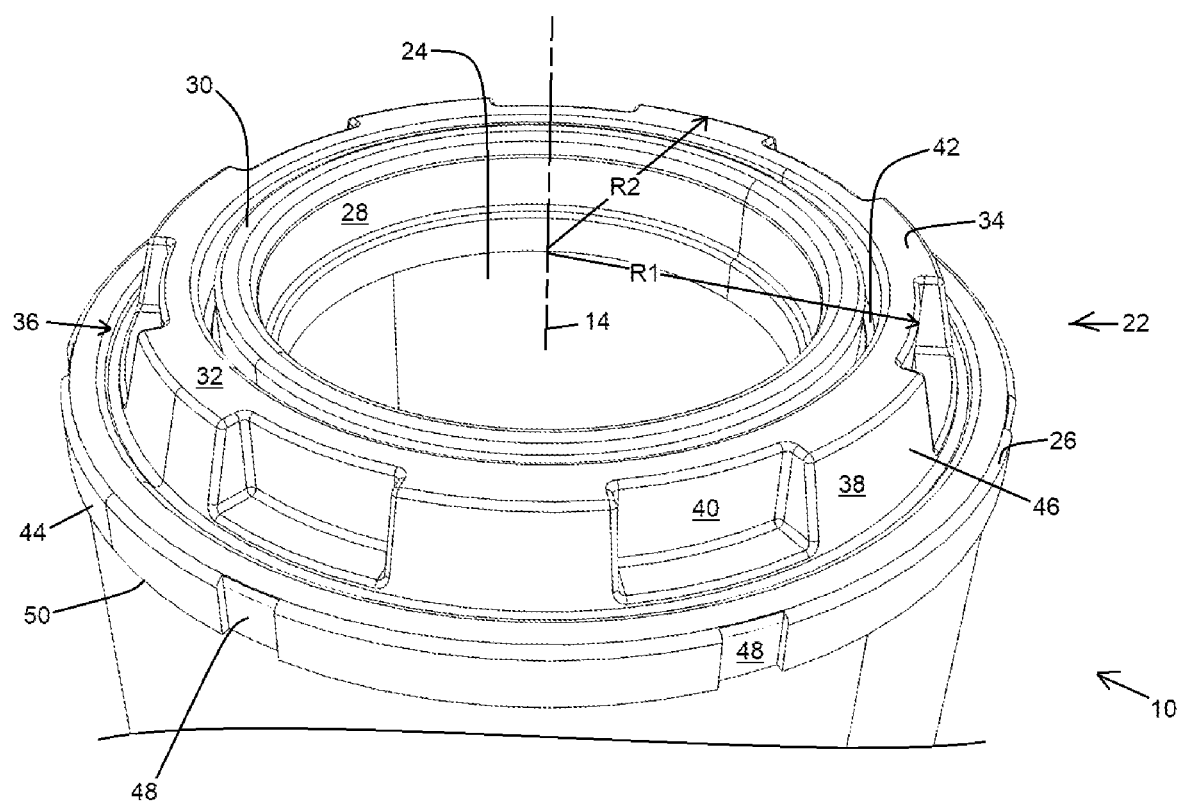
FIG. 3 is an enlarged perspective view of an axial end of the filter element of FIG. 2, more clearly showing the dual ring annular seal, and the positioning device having the positioning projects and recesses, consistent with the present inventive disclosure.
Figure 4:
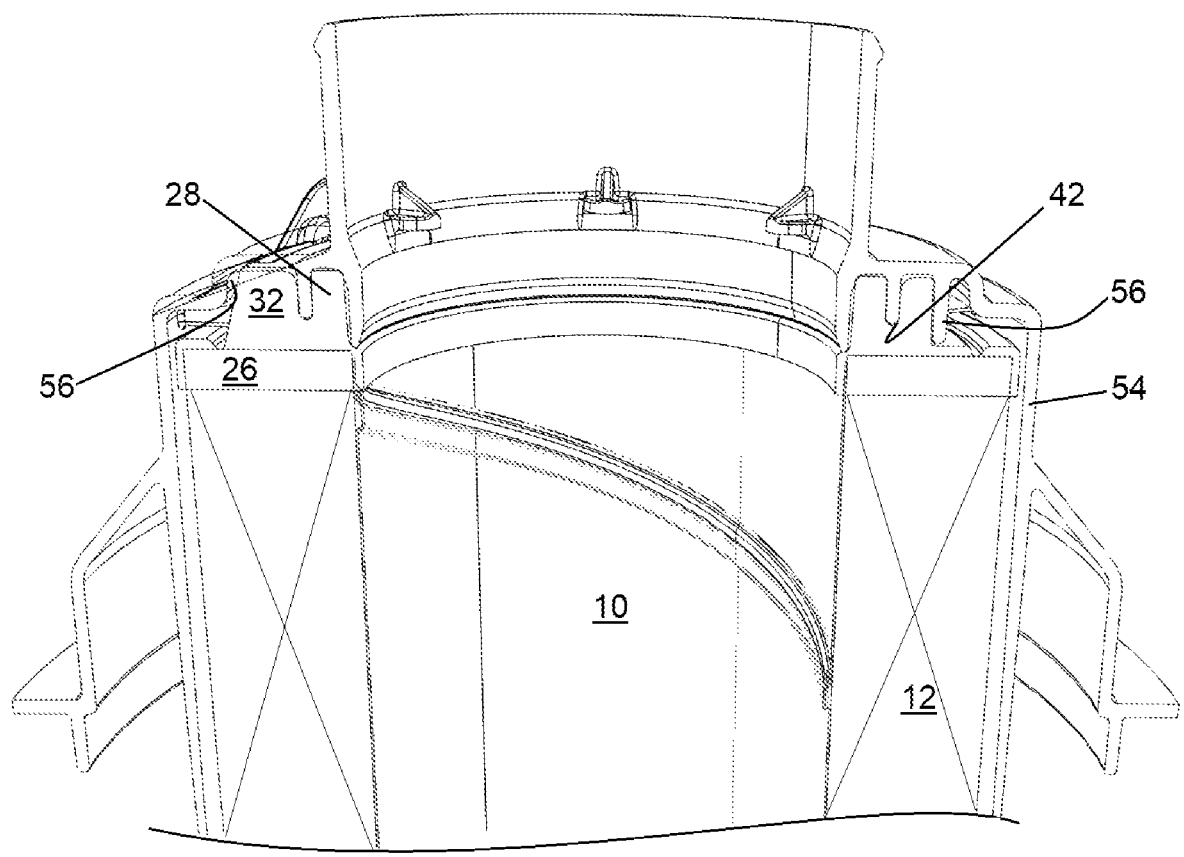
FIG. 4 is a sectional view of a filter element engaged with a filter housing component, consistent with the present inventive disclosure, the section taken along a center plane which is lying on the center axis of the filter element.

As best shown in FIGS. 2-4, the annular seal 22 surrounds a central opening 24 extending through the annular seal 22 and into an interior of the annular filter medium 12, providing what may be either a fluid inlet or a fluid outlet in communication with the interior of the filter element 10. The annular seal includes an annular base portion 26 forming an end disc or arranged on an end disc. The annular base portion 26 is radially extending across and is fixed onto the first axial end 16 of the filter medium 12 and covering the first axial end 16 of the filter medium 12.

A radially inner ring portion 28 of the annular seal 22 is formed on an axially outer face of the annular base portion 26 and projecting axially outwardly away from the annular base portion 26 to a first free axial end face 30 of the radially inner ring portion 28.

A radially outer annular ring portion 32 of the annular seal 22 is formed on the axially outer face of the annular base portion 26 and spaced radially outwardly away from radially inner ring portion 28. Preferably the radially outer annular ring portion 32 and the radially inner ring portion 28 are concentrically arranged relative to the central axis 14. The radially outer ring portion 32 projects axially outwardly away from the annular base portion 26 to a second free axial end face 34 of the radially outer annular ring portion 32.

Advantageously, the annular seal 22 includes a positioning device formed on a radially outer side 36 of the radially outer annular ring portion 32. The positioning device is formed by positioning projections 38 which are circumferentially spaced apart on a radially outer side 36 of the radially outer annular ring portion 32, together with positioning recesses or indentations 40 formed into and circumferentially spaced apart on the radial outer side 36 of the radially outer annular ring portion 32 of the annular seal 22. This is best shown in FIG. 3. Adjacent ones of the positioning projections 38 are spaced apart by a respective positioning recess 40 or indentation 40. The positioning projections 38 and positioning recesses or indentations 40 are sized, configured and arranged to positively engage cooperative configured geometries or key locking features 56 of the filter housing 54 when in an installed state, thereby locking a rotational orientation and position of the filter element 10 in the filter housing 54. The positioning recesses or indentations 40 extend axially from the second free axial end face 34 in a direction towards the annular base portion 26 of the annular seal 22.

The annular seal 22 further includes an annular sealing groove 42 formed in the radial spacing between the radially outer annular ring portion 32 and the radially inner ring portion 28 (see FIG. 3). The annular sealing groove 42 is configured to receive and seal against an annular ring projection of the filter housing when in the installed state of the filter element 10 in the filter housing 54.

Preferably the annular seal is unitary, formed in one piece of molded polyurethane foam or an another sufficiently structurally robust and sealably pliable elastomeric material.

Preferably the positioning recesses or indentations 40 are uniformly spaced apart from each other on the radially outer side of the radially outer annular ring portion 32.

Preferably the positioning recesses or indentations 40 have an arcuate base surface having substantially the shape of a cylinder section with a substantially constant indentation radius R1 relative to the central axis 14 of the filter element.

Preferably the positioning projections 38 have a radially outer face 46 in which the radially outer faces 46 of the positioning projections 38 form substantially the shape of a cone sections, the radially outer face 46 having a projecting radius R2 relative to the central axis 14 of the filter element at the second free axial end face 34. To enable insertion without binding in the filter housing the radially outer faces 46 of the positioning projections 38 preferably slant radially inwardly relative to the central axis 14 when traversed in a direction from the annular base portion 26 to the second free axial end face 34.

In some embodiments, the annular base portion 26 at a radially outer side has an annular lip 50 which projects axially inwardly over a radially outer flow face 52. The annular lip 50 may include a plurality of radial lip indentations 48 which are circumferentially spaced apart from each other on the annular lip 50. The radial lip indentations 48 are positioned radially outwardly away from the plurality of circumferentially spaced apart radial projections 38 of the radially outer annular ring portion 32 of the annular seal 22.

To provide a greater surface area for positive locking engagement with the filter housing, the positioning recesses or indentations 40 may extend axially from the second free axial end face 34 to the annular base portion 26 of the annular seal 22.

In preferred embodiments, the first free axial end face 30 is recessed axially from the second free axial end face 34 by a distance of 1 to 5 mm, more preferably by a distance of 2 to 4 or 2 to 3 mm.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A filter element for exchangeable installation in a filter housing, the filter element comprising:
   an annular filter medium arranged in a tubular concentric shape surrounding a central axis, the annular filter medium having:
      a first axial end;
      a second axial end arranged opposite the first axial end;
      wherein the annular filter medium is zig-zag folded into a plurality of filter medium pleats extending from the first axial end to the second axial end;
   an annular seal secured directly or indirectly onto the first axial end of the filter medium and surrounding a central opening extending through the annular seal and into an interior of the annular filter medium, the annular seal having:
      an annular base portion shaped as an end disc, radially extending and covering the first axial end of the filter medium;
      a positioning and sealing section of the annular seal comprising:
         a radially inner ring portion, formed on an axially outer face of the annular base portion, surrounding the central opening and projecting axially outwardly away from the annular base portion to a first free axial end face of the radially inner ring portion;
         a radially outer annular ring portion, formed on the axially outer face of the annular base portion, spaced radially outwardly away from radially inner ring portion, surrounding the central opening and projecting axially outwardly away from the annular base portion to a second free axial end face of the radially outer annular ring portion;
         a positioning device formed on a radially outer side of the radially outer annular ring portion, comprising:
            positioning projections which are circumferentially spaced apart on the radially outer side of the radially outer annular ring portion;
            positioning recesses or indentations formed into and circumferentially spaced apart on the radial outer side of the radially outer annular ring portion of the annular seal;
            wherein adjacent ones of the positioning projections are spaced apart by a respective one of the positioning recesses or indentations;
            wherein the positioning projections and positioning recesses or indentations are adapted to positively engage cooperative configured geometries or key locking features of a filter housing when in an installed state, thereby locking a rotational orientation and establishing an axial position of the filter element in the filter housing;
            wherein the positioning recesses or indentations extend axially from the second free axial end face towards the annular base portion of the annular seal;
         the positioning and sealing section of the annular seal further including:
            an annular sealing groove formed in the radial spacing between the radially outer annular ring portion and the radially inner ring portion, the annular sealing groove configured to receive and seal against an annular projection of the filter housing, when in the installed state;

wherein the first free axial end face extends axially outward from the annular base portion by a projection distance d2;

wherein the second free axial end face extends axially outward from the radially extending annular base portion by a projection distance d1;

wherein d1>d2, such that the first free axial end face is recessed axially from the second free axial end face.

2. The filter element according to claim 1, wherein the annular seal is unitary, formed in one piece of polyurethane, polyurethane foam or another elastomer.

3. The filter element according to claim 1, wherein the positioning recesses or indentations are uniformly spaced apart from each other on the radially outer side of the radially outer annular ring portion.

4. The filter element according to claim 1, wherein the positioning recesses or indentations have an arcurate back face substantially the shape of a cylinder section having an indentation radius R1 relative to the central axis of the filter element.

5. The filter element according to claim 1, wherein the positioning projections have a radially outer face having substantially the shape of a cone section, the radially outer face having a projecting radius R2 relative to the central axis of the filter element at the second free axial end face;

wherein the radially outer face of the positioning projections slants radially inwardly relative to the central axis when traversed in an axial direction from the annular base portion to the second free axial end face.

6. The filter element according to claim 1, wherein the annular base portion has an annular lip which projects axially inwardly over a radially outer flow face of the annular filter medium;

wherein the annular lip includes a plurality of radial lip indentations circumferentially spaced apart from each other;

wherein the radial lip indentations are spaced radially outwardly from the plurality of circumferentially spaced apart radial projections of the radially outer annular ring portion of the annular seal.

7. The filter element according to claim 1, wherein the positioning recesses or indentations extend axially from the second free axial end face to the annular base portion of the annular seal.

8. The filter element according to claim 1, wherein d1>d2, such that the first free axial end face is recessed axially from the second free axial end face by an axial distance of 1 to 5 mm.

9. The filter element according to claim 8, wherein d1>d2, such that the first free axial end face is recessed axially from the second free axial end face by an axial distance of 2 to 3 mm.

10. A filter element comprising:
a filter medium surrounding a central axis and having:
  a first axial end;
  a second axial end opposite the first axial end;
  wherein the filter medium extends from the first axial end to the second axial end; and
a seal on the first axial end of the filter medium having:
  a base portion covering the first axial end of the filter medium;
  an inner ring portion formed on an axially outer face of the base portion and projecting axially outward from the base portion to a first free axial end face of the inner ring portion;
  an outer ring portion formed on the axially outer face of the base portion and projecting axially outward from the base portion to a second free axial end face of the outer ring portion;
  wherein the first free axial end face extends axially outward from the base portion by a projection distance d2;
  wherein the second free axial end face extends axially outward from the base portion by a projection distance d1; and
  wherein d1>d2, such that the first free axial end face is recessed axially from the second free axial end face.

11. The filter element according to claim 10, wherein the annular seal is unitary, formed in one piece of polyurethane, polyurethane foam or another elastomer.

12. The filter element according to claim 10, wherein d1>d2, such that the first free axial end face is recessed axially from the second free axial end face by an axial distance of 1 to 5 mm.

13. The filter element according to claim 12, wherein d1>d2, such that the first free axial end face is recessed axially from the second free axial end face by an axial distance of 2 to 3 mm.

14. A filter system comprising:
a filter housing; and
a filter medium surrounding a central axis and having:
  a first axial end;
  a second axial end opposite the first axial end;
  wherein the filter medium extends from the first axial end to the second axial end; and
a seal on the first axial end of the filter medium having:
  a base portion covering the first axial end of the filter medium;
  an inner ring portion formed on an axially outer face of the base portion and projecting axially outward from the base portion to a first free axial end face of the inner ring portion;
  an outer ring portion formed on the axially outer face of the base portion and projecting axially outward from the base portion to a second free axial end face of the outer ring portion;
  wherein the first free axial end face extends axially outward from the base portion by a projection distance d2;
  wherein the second free axial end face extends axially outward from the base portion by a projection distance d1; and
  wherein d1>d2, such that the first free axial end face is recessed axially from the second free axial end face; and
a positioning and sealing section formed on an outer side of the outer ring portion, comprising:
  positioning projections circumferentially spaced apart on the outer side of the outer ring portion;
  positioning recesses formed into and circumferentially spaced apart on the outer side of the outer ring portion of the seal;
    wherein adjacent ones of the positioning projections are spaced apart by a respective one of the positioning recesses;
    wherein the positioning projections and the positioning recesses positively engage the filter housing in an installed state, thereby locking a rotational orientation and establishing an axial position of the filter medium in the filter housing; and a sealing groove formed in a radial spacing between the outer ring portion and the inner ring portion, the sealing groove receiving and sealing against a projection of the filter housing in the installed state.

15. The filter system according to claim 14, wherein the positioning recesses are uniformly spaced apart on the outer side of the outer ring portion.

16. The filter system according to claim 14, wherein the positioning recesses have an arcurate back face in the shape of a cylinder section having an indentation radius R1 relative to a central axis of the filter medium.

17. The filter system according to claim 14,
wherein the positioning projections have an outer face in the shape of a cone section having a projecting radius R2 relative to a central axis of the filter medium at the second free axial end face; and
wherein the outer face of the positioning projections slants inwardly relative to the central axis of the filter medium when traversed in an axial direction from the base portion to the second free axial end face.

18. The filter system according to claim 14, wherein the positioning recesses extend axially from the second free axial end face to the base portion of the seal.

\* \* \* \* \*